(12) United States Patent
Lee (10) Patent No.: US 10,889,272 B2
(45) Date of Patent: Jan. 12, 2021

(54) AUTONOMOUS EMERGENCY BRAKING APPARATUS AND CONTROL METHOD THEREOF

(71) Applicant: HYUNDAI MOBIS Co., Ltd., Seoul (KR)

(72) Inventor: Joo Yeob Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 177 days.

(21) Appl. No.: 16/170,043

(22) Filed: Oct. 25, 2018

(65) Prior Publication Data

US 2019/0126892 A1 May 2, 2019

(30) Foreign Application Priority Data

Oct. 30, 2017 (KR) .................. 10-2017-0142877

(51) Int. Cl.
*B60T 7/22* (2006.01)
*G05D 1/00* (2006.01)
(Continued)

(52) U.S. Cl.
CPC .............. *B60T 7/22* (2013.01); *B60T 8/17* (2013.01); *B60W 10/18* (2013.01); *B60W 40/04* (2013.01); *B60W 40/06* (2013.01); *B60W 50/14* (2013.01); *G01S 13/865* (2013.01); *G01S 13/867* (2013.01); *G01S 13/931* (2013.01); *G01S 17/00* (2013.01); *G05D 1/0055* (2013.01); *G05D 1/0088* (2013.01); *G05D 1/0223* (2013.01); *B60T 2201/022* (2013.01); *B60T 2210/00* (2013.01); *B60T 2210/32* (2013.01);
(Continued)

(58) Field of Classification Search
None
See application file for complete search history.

(56) References Cited

U.S. PATENT DOCUMENTS

2002/0022927 A1* 2/2002 Lemelson ................ G08G 1/20
701/301
2002/0057194 A1* 5/2002 Iwasaki ..................... B60T 7/22
340/435

(Continued)

FOREIGN PATENT DOCUMENTS

KR 10-1526622 6/2015

*Primary Examiner* — Richard M Camby
(74) *Attorney, Agent, or Firm* — H.C. Park & Associates, PLC (57) ABSTRACT

An autonomous emergency braking apparatus may include: a front sensor configured to sense object information by searching for a control target ahead of a vehicle; a compensation condition sensor configured to sense a vehicle state and a surrounding environment, in order to estimate the road state and the driving environment of the vehicle; a brake controller configured to generate a braking force to brake the vehicle; a warning controller configured to notify an operation state when the vehicle is braked; and a controller configured to calculate a braking force and braking point, adjust the road state estimated from the vehicle state sensed through the compensation condition sensor and the braking force and the braking point which are calculated according to the surrounding environment, output a braking command to the brake, and notify the operation state through the warning controller according to the braking command.

12 Claims, 4 Drawing Sheets

(51) Int. Cl.

| | |
|---|---|
| *G05D 1/02* | (2020.01) |
| *B60W 40/04* | (2006.01) |
| *B60W 10/18* | (2012.01) |
| *B60W 50/14* | (2020.01) |
| *B60W 40/06* | (2012.01) |
| *G01S 13/931* | (2020.01) |
| *G01S 17/00* | (2020.01) |
| *G01S 13/86* | (2006.01) |
| *B60T 8/17* | (2006.01) |

(52) U.S. Cl.
CPC .... *B60T 2230/00* (2013.01); *B60W 2050/143* (2013.01); *G01S 2013/93185* (2020.01); *G05D 2201/0213* (2013.01)

(56) References Cited

U.S. PATENT DOCUMENTS

| | | | |
|---|---|---|---|
| 2003/0135318 A1* | 7/2003 | Tellis | B60W 30/16 |
| | | | 701/96 |
| 2013/0338877 A1* | 12/2013 | Straus | G08G 1/161 |
| | | | 701/41 |
| 2017/0235307 A1* | 8/2017 | Asakura | B60W 40/12 |
| | | | 701/23 |
| 2017/0240183 A1* | 8/2017 | Suzuki | G05D 1/0088 |
| 2018/0065644 A1* | 3/2018 | Kim | B60W 30/08 |

\* cited by examiner

AUTONOMOUS EMERGENCY BRAKING APPARATUS AND CONTROL METHOD THEREOF

CROSS-REFERENCES TO RELATED APPLICATIONS

This application claims priority from and the benefit of Korean Patent Application No. 10-2017-0142877, filed on Oct. 30, 2017, which is hereby incorporated by reference for all purposes as if set forth herein.

BACKGROUND

Field

Exemplary embodiments relate to an autonomous emergency braking apparatus and a control method thereof, and more particularly, to an autonomous emergency braking apparatus which can not only adjust a braking force and a braking point by considering various road and driving environments through a plurality of sensors, but also actively operate in a critical situation of the sensors, and a control method thereof.

Discussion of the Background

An AEB (Autonomous Emergency Braking) system refers to a device that predicts a collision with a vehicle, two-wheeled vehicle, bicycle, obstacle or pedestrian ahead of a control vehicle, determines the circumstances of the collision, and performs a warning and automatic braking function, thereby avoiding or reducing the collision to minimize the damage.

The AEB system monitors a relative distance from a vehicle ahead and information on whether there is a vehicle ahead, and determines when to start or end AEB control. Examples of a currently used forward vehicle monitoring sensor may include a radar, lidar (Light Detection And Ranging), camera and the like.

The AEB system can reduce a traffic accident which may be caused by a driver's carelessness or limit during driving, thereby reducing an unnecessary social cost while improving the driving environment.

The related art of the present invention is disclosed in Korean Patent Registration No. 10-1526622 registered on Jun. 8, 2015 and entitled "Engine stop prevention method of AEB system".

Since the conventional AEB system is operated based on a test in a well paved test course under good weather, the AEB system may not reflect an actual road driving environment. Therefore, there is a demand for an AEB system which can operate more actively with a braking force depending on various environments (slope way, bad weather and complex object).

Furthermore, although a part of sensors mounted in the AEB system is placed under a critical situation in a complex environment such as downtown, the AEB system needs to overcome such a situation and operate more reliably.

The above information disclosed in this Background section is only for enhancement of understanding of the background of the invention and, therefore, it may contain information that does not constitute prior art.

SUMMARY

Exemplary embodiments of the present invention are directed to an autonomous emergency braking apparatus which can not only adjust a braking force and a braking point by considering various road and driving environments through a plurality of sensors, but also actively operate in a critical situation of the sensors, and a control method thereof.

In one embodiment, an autonomous emergency braking apparatus may include: a front sensor configured to sense object information by searching for a control target ahead of a vehicle; a compensation condition sensor configured to sense a vehicle state and a surrounding environment, in order to estimate the state of a road on which the vehicle travels and the driving environment of the vehicle; a brake configured to generate a braking force to brake the vehicle; a warning controller configured to notify an operation state when the vehicle is braked; and a controller configured to calculate a braking force and braking point by determining whether the vehicle is likely to collide, based on the object information sensed through the front sensor, adjust the road state estimated from the vehicle state sensed through the compensation condition sensor and the braking force and the braking point which are calculated according to the surrounding environment, output a braking command to the brake, and notify the operation state through the warning controller according to the braking command.

The front sensor may include one or more of a radar, lidar and camera.

The object information may include one or more of a relative distance from the control target, velocity, acceleration and object property.

The road state may include one or more of a road gradient and road flatness.

The surrounding environment may include one or more of a weather condition and vehicle weight.

The compensation condition sensor may include: a vehicle height displacement sensor configured to sense the front and rear heights of the vehicle; a shock absorber displacement sensor configured to measure a displacement of a shock absorber installed on each shaft of the vehicle; a weather prediction sensor configured to sense a motion of a wiper in the vehicle, rainfall condition and outside temperature; a map system configured to provide road information from a map information system; and a vehicle posture sensor configured to provide state information of the vehicle.

The brake may include: a braking system unit configured to generate a braking force by operating a brake according to the braking command; and an engine system unit configured to operate an engine brake according to the braking command, and remove an acceleration force.

The warning controller may include one or more: an alarm configured to output a warning sound; a display configured to display a warning; and an active seat belt controller configured to provide a wearing state of a seat belt to the controller, and pull the seat belt according to the braking command.

In another embodiment, a control method of an autonomous emergency braking apparatus may include: searching for, by a controller, a control target and a compensation condition through a front sensor and a compensation condition sensor; setting, by the controller, the control target and determining a collision risk based on sensed object information; calculating, by the controller, a target braking force and target braking point, when it is determined that there is a collision risk; compensating for, by the controller, a braking command based on the search result of the compensation condition, and outputting the braking command to a brake; and operating, by the controller, a warning controller according to the braking command.

The setting of the control target may include: determining, by the controller, whether the reliability of target information provided from a plurality of sensors of the front sensor is equal to or more than a preset level; generating, by the controller, a fusion track for autonomous emergency braking, when the reliability of the target information is equal to or more than the preset level; determining, by the controller, whether the reliability of the target information is maintained, after generating the fusion track; determining, by the controller, whether reliability by a single sensor is high, when the reliability of the target information is not maintained, and determining whether the target information is recovered within a preset time; setting, by the controller, the control target using the fusion track, when the reliability of the target information is maintained or the target information is recovered within the preset time; and removing, by the controller, the fusion track when the reliability of the target information is not maintained, the reliability by the single sensor is low, and the target information is not recovered within the preset time.

In the searching for the compensation condition, the controller may search for one or more of a road gradient, road flatness, weather condition and vehicle weight.

The object information may include one or more of a relative distance from the control target, velocity, acceleration and object property.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Figure 1:
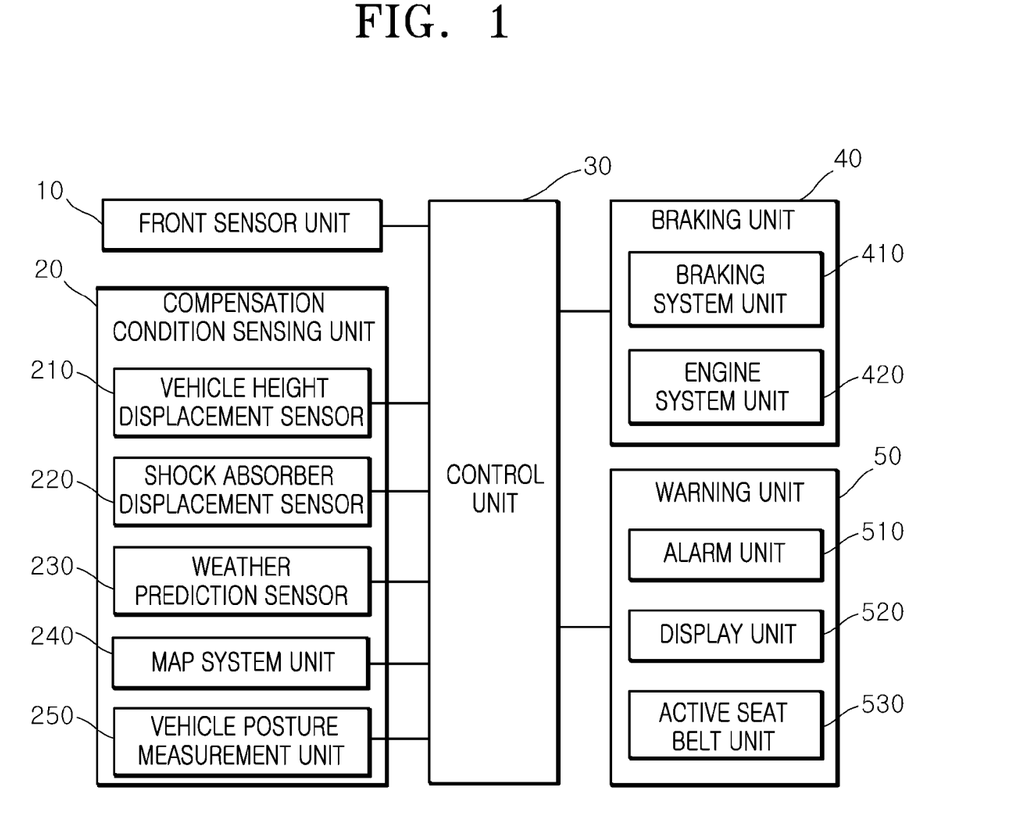
FIG. 1 is a block diagram illustrating an autonomous emergency braking apparatus in accordance with an embodiment of the present invention.
Figure 2:
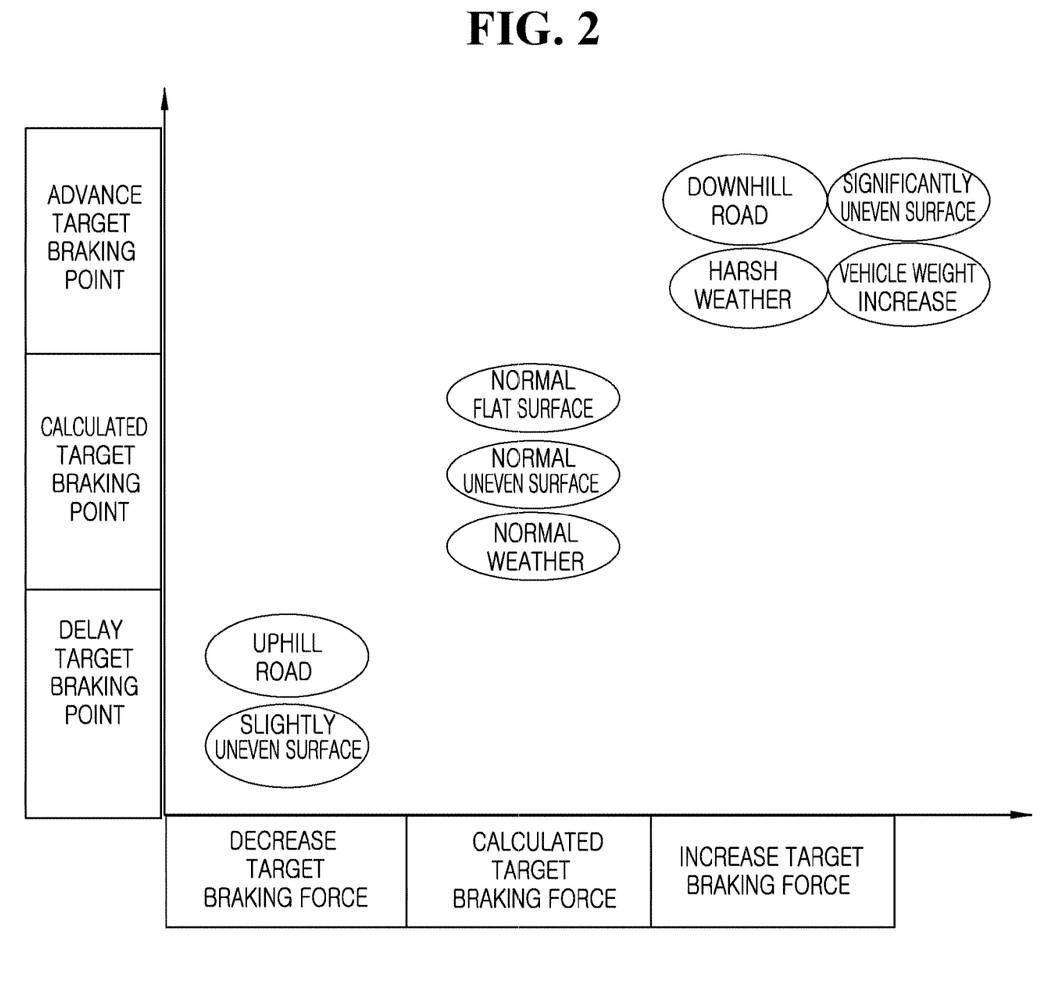
FIG. 2 illustrates a compensation state of the autonomous emergency braking apparatus in accordance with the embodiment of the present invention.

FIG. 1 is a block diagram illustrating an autonomous emergency braking apparatus in accordance with an embodiment of the present invention, and FIG. 2 illustrates a compensation state of the autonomous emergency braking apparatus in accordance with the embodiment of the present invention.

As illustrated in FIG. 1, the autonomous emergency braking apparatus in accordance with the embodiment of the present invention may include a front sensor 10, a compensation condition sensor 20, a brake 40, a warning controller 50 and a controller 30.

The front sensor 10 may search for a control target among a vehicle, two-wheeled vehicle, bicycle, pedestrian and obstacle ahead of the ego vehicle, sense object information, and provide the sensed information to the controller 30.

The front sensor 10 may include one or more of a radar, lidar and camera.

The object information may include one or more of a relative distance from the control target, velocity, acceleration and object property.

The compensation condition sensor 20 may sense the state of the vehicle and the surrounding environment of the vehicle, and provide the sensed information to the controller 30, in order to predict the state of the road on which the vehicle travels and the driving environment of the vehicle.

The road state may include one or more of a road gradient and road flatness, and the surrounding environment may include one or more of a weather condition and vehicle weight.

Therefore, the compensation condition sensor 20 may include one or more of a vehicle height displacement sensor 210, a shock absorber displacement sensor 220, a weather prediction sensor 230, a map system 240 and a vehicle posture sensor 250.

The vehicle height displacement sensor 210 may sense a change in front/rear height of the vehicle, and provide the sensed change to the controller 30.

Therefore, the controller 30 may sense a passenger's ride or freight loading through the change in front/rear vehicle height of the vehicle, which is sensed through the vehicle height displacement sensor 210. That is, the controller 30 may estimate the ride or loading and weight of the passenger or freight by sensing a start on/off, a trunk on/off, and the change in front/rear height of the vehicle during driving/parking, in addition to the basic front and rear heights of the empty vehicle.

For example, when a driver opens the trunk to load a heavy object, the rear vehicle height may be decreased, and the front vehicle height may be slightly increased. Furthermore, when five passengers including the driver get on the vehicle, both of the front and rear vehicle heights may be decreased. The controller 30 may sense a passenger ride or freight loading through a difference between the front and rear vehicle heights, estimate the total weight of the vehicle body, and adjust a target braking point and braking force in case of autonomous emergency braking.

The controller 30 may estimate the gradient of the road on which the vehicle is traveling, through a change of the vehicle height. In this case, the controller 30 may estimate the gradient of the road through correction based on acceleration/deceleration information of the vehicle by the driver and data of a posture sensor of the vehicle.

The shock absorber displacement sensor 220 may measure a displacement of a shock absorber installed on each shaft of the vehicle, and provide the measured displacement to the controller 30.

Therefore, since the shock absorber displacement sensor 220 can measure the displacement of the shock absorber on each of the four shafts (RR/RL/FL/FR) of the vehicle, the controller 30 may receive the magnitude and cycle of the displacement, and determine the road state. For example, when the magnitude of the received displacement is large and the cycle of the received displacement is short, the controller 30 may estimate that the corresponding road is an unpaved road. On the other hand, when the magnitude of the received displacement is small and the cycle of the received displacement is long, the controller 30 may estimate that the corresponding road is a paved road.

When the road state is determined to be good, the controller 30 may maintain the target braking point and the braking force in case of autonomous emergency braking. On the other hand, when the road state is determined to be bad, the controller 30 may adjust the target braking point and the braking force in case of autonomous emergency braking.

Since the shock absorber displacement sensor 220 receives the displacements of the four shafts of the vehicle, the controller 30 may estimate the gradients of the left and right road surfaces of the vehicle. Thus, the controller 30 may perform stable autonomous emergency braking through braking control for each wheel.

The weather prediction sensor 230 may sense a wiper motion, a rainfall condition and outside temperature, and provide the sensed information to the controller 30 to predict the weather.

Therefore, the controller 30 may sense whether it is raining, snowing or hailing, based on the motion and state of the wiper, sensed through the weather prediction sensor 230, determine whether the temperature is high or low, through the outside temperature, and estimate the road state depending on the weather, based on the sensing result and the determination result. When a normal road friction force is not expected due to the influence of the weather or temperature, the controller 30 may reflect the road state to adjust the target braking point and the braking force in case of autonomous emergency braking.

The map system 240 may provide the gradient of the road surface or the road information from the map information system to the controller 30, and the vehicle posture sensor 250 may provide the velocity, longitudinal/lateral acceleration and state information of the vehicle to the controller 30, and calculate the target braking point and the braking force in case of autonomous emergency braking.

The brake 40 may generate a braking force in order to brake the vehicle according to a braking command of the controller 30.

The brake 40 may include a braking system unit 410 configured to generate a braking force by operating the brake according to the braking command. The brake 40 may further include an engine system unit 420 configured to operate an engine brake and remove an acceleration force according to the braking command, in order to perform cooperation control.

The warning controller 50 may inform the driver of the operation state using visual, auditory and tactile information, in case of autonomous emergency braking of the vehicle according to the braking command.

For this operation, the warning controller 50 may include one or more of an alarm 510, a display 520 and an active seat belt controller 530. The alarm 510 may output an auditory warning sound. The display 520 may output a visual warning. The active seat belt controller 530 may provide the wearing state of a seat belt to the controller 30, and pull the seat belt according to the braking command, thereby reducing swaying and shock which may occur in case of a collision.

The controller 30 may receive the wearing state of the seat belt from the active seat belt controller 530, determine whether the driver wears the seat belt, and adjust the braking force when outputting the braking command.

The controller 30 may determine whether the vehicle is likely to collide, based on the object information sensed from the front sensor 10, calculate a braking force and a braking point, and adjust the braking force and the braking point by searching for the road gradient, the road flatness, the weather condition and the vehicle height according to the road state and the surrounding environment which are estimated from the vehicle state sensed through the compensation condition sensor 20.

For example, when the road is a downhill road and has a significantly uneven surface, the weather condition is harsh, and the vehicle weight is increased as illustrated in FIG. 2, the controller 30 may advance the target braking point based on the calculated target braking point, and increase the target braking force in comparison to the calculated target braking force.

Furthermore, since the road is an uphill road and has a slightly uneven surface, the controller 30 may delay the target braking point based on the calculated target braking point, and decrease the target braking force in comparison to the calculated target braking force.

As such, the controller 30 may adjust the braking force and the braking point depending on the road state and the surrounding state, output the braking command to the brake 40, and notify the operation state through the warning controller 50 according to the braking command.

As described above, the autonomous emergency braking apparatus in accordance with the embodiment of the present invention can not only adjust the braking force and the braking point through the plurality of sensors in consideration of various road and driving environments, but also actively operate in a critical situation of the sensors to provide a reliable braking ability in various driving environments, thereby increasing the reliability of the system.

Figure 3:
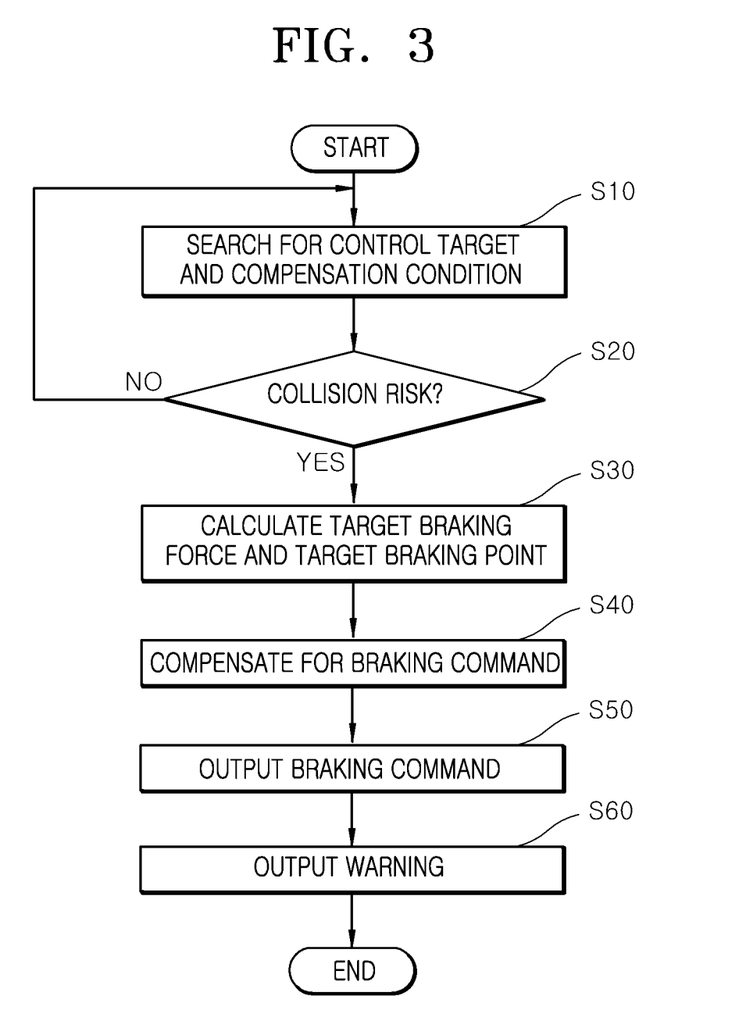
FIG. 3 is a flowchart illustrating a control method of an autonomous emergency braking apparatus in accordance with an embodiment of the present invention.
Figure 4:
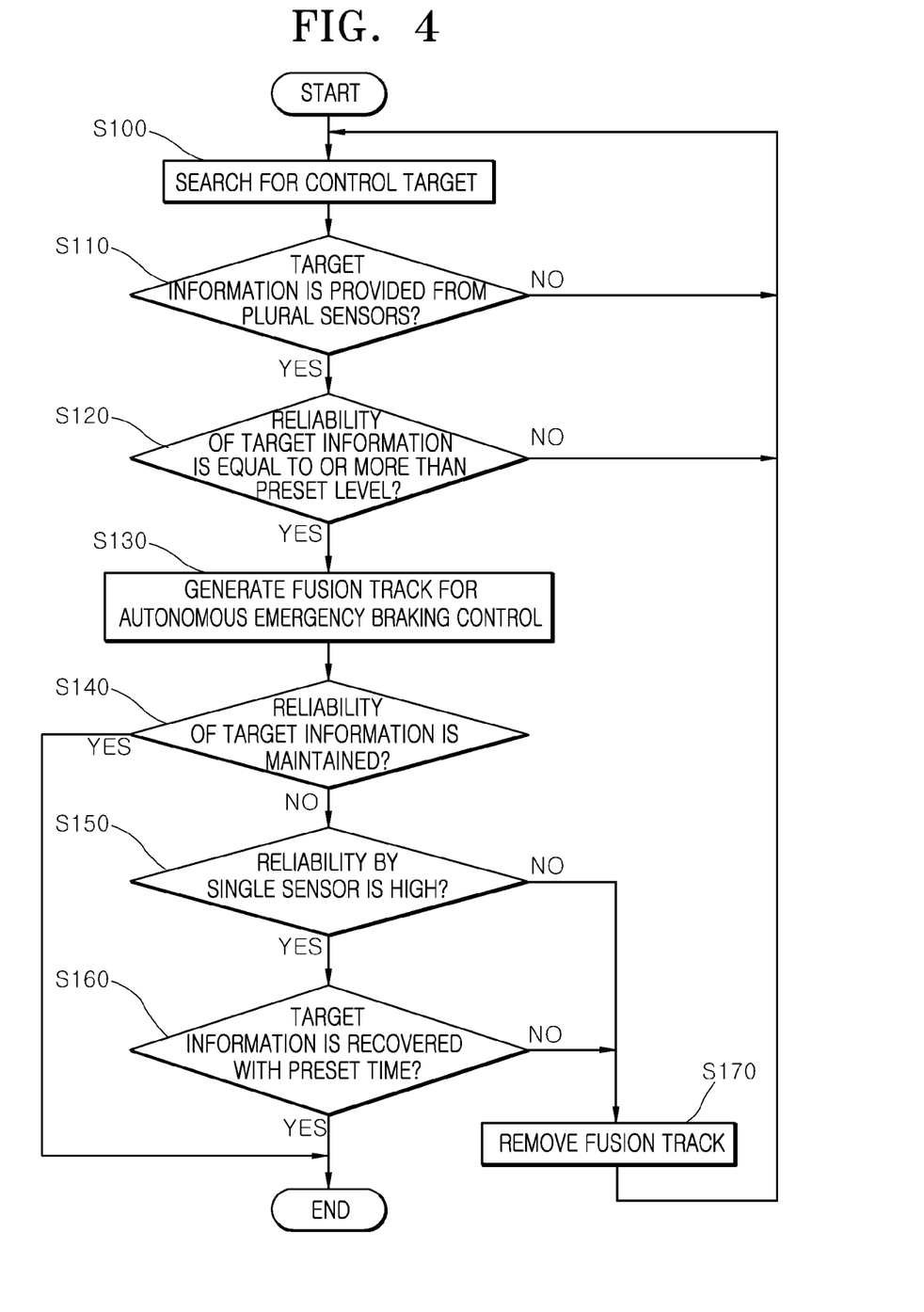
FIG. 4 is a flowchart illustrating a process of setting a control target in the control method of the autonomous emergency braking apparatus in accordance with the embodiment of the present invention.

FIG. 3 is a flowchart illustrating a control method of an autonomous emergency braking apparatus in accordance with an embodiment of the present invention, and FIG. 4 is a flowchart illustrating a process of setting a control target in the control method of the autonomous emergency braking apparatus in accordance with the embodiment of the present invention.

As illustrated in FIG. 3, the control method of the autonomous emergency braking apparatus in accordance with the embodiment of the present invention may start with step S10 in which the controller 30 searches for a control target and a compensation condition through the front sensor 10 and the compensation condition sensor 20.

When searching for the compensation condition, the controller 30 may search for one or more of a road gradient, road flatness, weather condition and vehicle weight.

After searching for the control target at step S10, the controller 30 may set the control target, and determine a collision risk based on sensed object information, at step S20.

When setting the control target after searching for the control target, the controller 30 may search for the control target based on a sensing result inputted from the front sensor 10 at step S100, as illustrated in FIG. 4.

Based on the result obtained by searching for the control target at step S100, the controller 30 may determine whether target information is provided from the plurality of sensors of the front sensor 10, at step S110.

When it is determined at step S110 that the target information is not provided from the plurality of sensors, the procedure may return to step S100 in order to continuously search for a control target.

On the other hand, when it is determined at step S110 that the target information is provided from the plurality of sensors, the controller 30 may determine whether the reliability of the target information is equal to or more than a preset level, at step S120.

When it is determined at step S120 that the reliability of the target information is less than the preset level, the controller 30 may return to step S100 to continuously search for a control target.

On the other hand, when it is determined at step S120 that the reliability of the target information is equal to or more than the preset level, the controller 30 may generate a fusion track for autonomous emergency braking control, at step S130.

After generating the fusion track at step S130, the controller 30 may determine whether the reliability of the target information is maintained, at step S140.

When it is determined at step S140 that the reliability of the target information is maintained, the controller 30 may return in order to set the control target using the fusion track and to determine a collision risk.

On the other hand, when it is determined at step S140 that the reliability of the target information is not maintained, the controller 30 may determine whether the reliability of target information provided by a single sensor is high, at step S150.

When it is determined at step S150 that the reliability of the target information provided by the single sensor is high, the controller 30 may determine whether the target information is recovered within a preset time, at step S160.

That is, while the target information is provided from the single sensor, the controller 30 may determine whether target information is provided from a plurality of sensors.

On the other hand, when it is determined at step S150 that the reliability of the target information provided by the single sensor is low, the controller 30 may remove the generated fusion track at step S170, and return to step S100 to search for a control target.

When it is determined at step S160 that the target information is recovered within the preset time, the controller 30 may return in order to set the control target using the fusion track and to determine a collision risk.

However, when it is determined at step S160 that the target information is not recovered within the preset time, the controller 30 may remove the generated fusion track at step S170, and return to step S100 to search for a control target.

Although data are not provided from the plurality of sensors due to a complex environment or the performance limit of the sensors after the control target is generated, the controller may determine a collision risk using the set control target, when the reliability of the remaining data is high and the data are provided again within the preset time. Therefore, the autonomous emergency braking control can be reliably performed even under a complex driving environment or structure environment.

When it is determined at step S20 that there is no collision risk, the controller 30 may return to step S10 to continuously search for the control target and the compensation condition.

On the other hand, when it is determined at step S20 that there is a collision risk, the controller 30 may calculate a target braking force and a target braking point based on objection information, at step S30.

The object information may include one or more of a relative distance from the control target, velocity, acceleration and object property.

After calculating the target braking force and the target braking point at step S30, the controller 30 may compensate for a braking command by adjusting the target braking force and the target braking point based on the search result of the compensation condition, at step S40.

For example, when the road is a downhill road and has a significantly uneven surface, the weather condition is harsh, and the vehicle weight is increased as illustrated in FIG. 2, the controller 30 may advance the target braking point based on the calculated target braking point, and increase the target braking force in comparison to the calculated target braking force.

Furthermore, since the road is an uphill road and has a slightly uneven surface, the controller 30 may delay the target braking point based on the calculated target braking point, and decrease the target braking force in comparison to the calculated target braking force.

After compensating for the braking command at step S40, the controller 30 may output the braking command to the brake 40 at step S50.

Furthermore, the controller 30 may output a warning to the warning controller 50 according to the braking command, and inform the driver of the operation state of the autonomous emergency braking using visual, auditory and tactile information, at step S60.

As described above, the control method of the autonomous emergency braking apparatus in accordance with the embodiment of the present invention can not only adjust the braking force and the braking point through the plurality of sensors in consideration of various road and driving environments, but also actively operate in a critical situation of the sensors to provide a reliable braking ability in various driving environments, thereby increasing the reliability of the system.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An autonomous emergency braking apparatus comprising:
   a front sensor configured to sense object information by searching for a control target in front of a vehicle;
   a compensation condition sensor configured to sense a vehicle state and a surrounding environment, in order to estimate a state of a road on which the vehicle travels and the surrounding environment of the vehicle;
   a brake controller configured to generate a braking force to brake the vehicle;
   a warning controller configured to notify an operation state when the vehicle is braked; and
   a controller configured to calculate a braking force and a braking point by determining whether the vehicle is likely to collide, based on the object information, adjust a road state estimated from the vehicle state and the braking force and the braking point which are calculated according to the surrounding environment, output a braking command to the brake controller, and notify the operation state through the warning controller according to the braking command,
   wherein the compensation condition sensor comprises at least one of a vehicle height displacement sensor configured to sense a front height and a rear height of the vehicle and a shock absorber displacement sensor configured to measure a displacement of a shock absorber installed on each shaft of the vehicle.

2. The autonomous emergency braking apparatus of claim 1, wherein the front sensor comprises one or more of a radar, a lidar, and a camera.

3. The autonomous emergency braking apparatus of claim 1, wherein the object information comprises one or more of a relative distance from the control target, a velocity, an acceleration, and an object property.

4. The autonomous emergency braking apparatus of claim 1, wherein the road state comprises one or more of a road gradient and a road flatness.

5. The autonomous emergency braking apparatus of claim 1, wherein the surrounding environment comprises one or more information of a weather condition and a vehicle weight.

6. The autonomous emergency braking apparatus of claim 1, wherein the compensation condition sensor comprises:
   a weather prediction sensor configured to sense a motion of a wiper in the vehicle, a rainfall condition, and an outside temperature;
   a map system configured to provide a road information from a map information system; and
   a vehicle posture sensor configured to provide a state information of the vehicle.

7. The autonomous emergency braking apparatus of claim 1, wherein the brake controller comprises:
   a braking system configured to generate the braking force by operating a brake according to the braking command; and
   an engine system configured to operate an engine brake according to the braking command, and stop an acceleration force.

8. The autonomous emergency braking apparatus of claim 1, wherein the warning controller comprises one or more:
   an alarm configured to output a warning sound;
   a display configured to display a warning; and
   an active seat belt controller configured to provide a wearing state of a seat belt to the controller, and pull the seat belt according to the braking command.

9. A control method of an autonomous emergency braking apparatus, comprising:
   searching for, by a controller, a control target and a compensation condition through a front sensor and a compensation condition sensor;
   setting, by the controller, the control target and determining a collision risk based on a sensed object information;
   calculating, by the controller, a target braking force and a target braking point, when it is determined that there is a collision risk;
   compensating for, by the controller, a braking command based on the compensation condition, and outputting the braking command to a brake controller; and
   operating, by the controller, a warning controller according to the braking command,
   wherein the setting of the control target comprises:
      determining, by the controller, whether a reliability of a target information provided from a plurality of sensors of the front sensor is equal to or more than a preset level;
      generating, by the controller, a fusion track for autonomous emergency braking, when the reliability of the target information is equal to or more than the preset level.

10. The control method of claim 9, wherein the setting of the control target comprises:
    determining, by the controller, whether the reliability of the target information is maintained, after generating the fusion track;
    determining, by the controller, whether the reliability from a single sensor of the plurality of sensors is high, when the reliability of the target information is not maintained, and determining whether the target information is recovered within a preset time;
    setting, by the controller, the control target using the fusion track, when the reliability of the target information is maintained or the target information is recovered within the preset time; and
    removing, by the controller, the fusion track when the reliability of the target information is not maintained, the reliability from the single sensor is low, and the target information is not recovered within the preset time.

11. The control method of claim 9, wherein in the searching for the compensation condition, the controller searches for one or more of a road gradient, a road flatness, a weather condition, and a vehicle weight.

12. The control method of claim 9, wherein the object information comprises one or more of a relative distance from the control target, a velocity, an acceleration, and an object property.

* * * * *